(12) United States Patent
Wu et al.

(10) Patent No.: US 11,586,253 B2
(45) Date of Patent: Feb. 21, 2023

(54) INFORMATION HANDLING SYSTEM DISPLAY NARROW BORDER ASSEMBLY

(71) Applicant: Dell Products L.P., Round Rock, TX (US)

(72) Inventors: Chin-Chung Wu, Taipei (TW); Tsai Chien Lin, Taoyuan (TW); James D. Gossett, Tow, TX (US); Jing-Tang Wu, Gukeng Township (TW); Cheng-Pu Zhu, Taipei (TW)

(73) Assignee: Dell Products L.P., Round Rock, TX (US)

( * ) Notice: Subject to any disclaimer, the term of this patent is extended or adjusted under 35 U.S.C. 154(b) by 28 days.

(21) Appl. No.: 16/938,019

(22) Filed: Jul. 24, 2020

(65) Prior Publication Data

US 2022/0026956 A1   Jan. 27, 2022

(51) Int. Cl.
*G06F 1/16*   (2006.01)
(52) U.S. Cl.
CPC ................. *G06F 1/1654* (2013.01)
(58) Field of Classification Search
CPC .... G06F 1/1637; G06F 1/1654; G06F 1/1601; G02F 1/133308; G02F 1/133314; G02F 1/133322; G02F 1/13332
See application file for complete search history.

(56) References Cited

U.S. PATENT DOCUMENTS

| | | | |
|---|---|---|---|
| 6,885,411 B2 | 4/2005 | Ogawa et al. | |
| 6,919,937 B2* | 7/2005 | Kim | G02F 1/133308 349/58 |
| 7,206,038 B2 | 4/2007 | Choi et al. | |
| 7,545,629 B1* | 6/2009 | Bauer, Jr. | G06F 1/1637 361/679.27 |
| 7,929,075 B2 | 4/2011 | Lee | |
| 8,630,085 B2* | 1/2014 | Sawada | H05K 5/0017 361/679.21 |
| 8,670,226 B2* | 3/2014 | Lee | G06F 1/1601 361/679.21 |
| 2003/0103170 A1* | 6/2003 | Nagata | G02F 1/133308 348/794 |
| 2016/0041420 A1* | 2/2016 | Takase | G06F 1/1637 361/679.27 |
| 2019/0072812 A1 | 3/2019 | Fujii et al. | |

* cited by examiner

*Primary Examiner* — James Wu
(74) *Attorney, Agent, or Firm* — Zagorin Cave LLP; Robert W. Holland (57) ABSTRACT

An information handling system display removably couples to a housing with a sliding structure of the display that engages a coupling structure disposed at opposing sides of the housing. For example, the sliding structure is a member that aligns under a lip formed in the coupling structure. In one embodiment, the sliding structure comprises plural pins extending from opposing sides of the display to enter channels at the side of the housing that direct the pins under a lip at the base of the channel.

7 Claims, 8 Drawing Sheets

INFORMATION HANDLING SYSTEM DISPLAY NARROW BORDER ASSEMBLY

BACKGROUND OF THE INVENTION

Field of the Invention

The present invention relates in general to the field of portable information handling systems, and more particularly to an information handling system display narrow border assembly.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In a clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

Generally, end users select a portable information handling system size based upon a desired display viewing area. Typically, portable information handling system displays couple at an opening in a housing to present visual images across the surface area of the housing. As a general goal, manufacturers attempt to minimize system Z-height or thickness and system weight around the selected display size. At the front of the housing where the display is viewed, manufacturers generally attempt to maximize the amount of the front surface area at which visual images are presented. One common goal is to achieve a zero bezel appearance in which the display extends to the edge of the housing without a bezel covering the display outer perimeter. Achieving a minimal structure around the perimeter of the display improves system aesthetics and helps to reduce the overall housing size by efficiently using the front housing area for visual image presentation.

One difficulty with manufacture of information handling systems having a zero bezel is that minimal space is available to couple the display to the housing. One conventional approach is to couple the display in the housing opening with SR adhesive tape between the bottom of the display and the housing. Adhesive tape provides coupling with minimal vertical and no lateral space. However, using an adhesive tape does introduce some difficulties during assembly and in the event that maintenance is needed on the information handling system in the field. For instance, once a display is assembled, disassembly is difficult and can result in damage to the display panel. During manufacture, if a problem is determined with a system, failure of the display at disassembly from the housing can result in component waste and increased manufacture costs. After release of the information handling system, field maintenance becomes difficult and can result in waste of an otherwise repairable system. Thus, costs associated with the use of adhesive tape are compounded by waste of other components when a repair attempt fails. Generally, display panels have too thin of a profile to reliably survive removal of a display panel from a housing after adhesive tape is applied.

SUMMARY OF THE INVENTION

Therefore, a need has arisen for a system and method which assembles a display panel to a housing in a removable manner.

In accordance with the present invention, a system and method are provided which substantially reduce the disadvantages and problems associated with previous methods and systems for assembly and disassembly of a display panel into an information handling system housing. A structure disposed on the display panel includes an extension that slides under a lip of the housing to couple the display to the housing with a sliding installation that allows removal of the display with an opposing sliding movement.

More specifically, an information handling system processes information with processing components, such as a processor and memory, disposed in a housing that generate information for presentation as visual images at a display integrated in the housing. For example, the housing has a portable configuration with a main housing portion that contains the processing components rotationally coupled by a hinge to a lid housing portion that contains the display. One or more members extending from opposing sides of the display engage under one or more lips formed in opposing sides of the housing to couple the display into position where a coupling device, such as a screw, prevents the display from additional sliding after installation. In one example embodiment, a sliding structure having an L-shape couples to the bottom corner on each side of the display with the vertical portion of the L-shape forming a member to engage under a lid integrated at the housing side and the bottom portion of the L-shape sliding along a sliding structure disposed at the bottom of the housing. As an alternative, a metallic housing of the display may extend metallic members towards the sides of the housing. In another alternative embodiment, the one or more members and plural pins that fit into a descending channel formed in the housing sides and directing the pins under a lip structure.

The present invention provides a number of important technical advantages. One example of an important technical advantage is that a display slidingly engages and disengages with a housing to allow ready removal of the display for servicing so that display may be reused. A sliding structure provides a relatively simple and straightforward assembly process for rapid manufacture. No adhesive is applied so that thin display parts do not face torsional forces that can cause damage upon removal attempts. As a result manufacture and servicing costs are reduced. Minimal structure for the sliding engagement and disengagement of the display in the housing provides for a narrow bezel display assembly.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A sliding structure coupled to a display panel lower surface engages a coupling structure of an information handling system housing to provide a zero bezel display. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
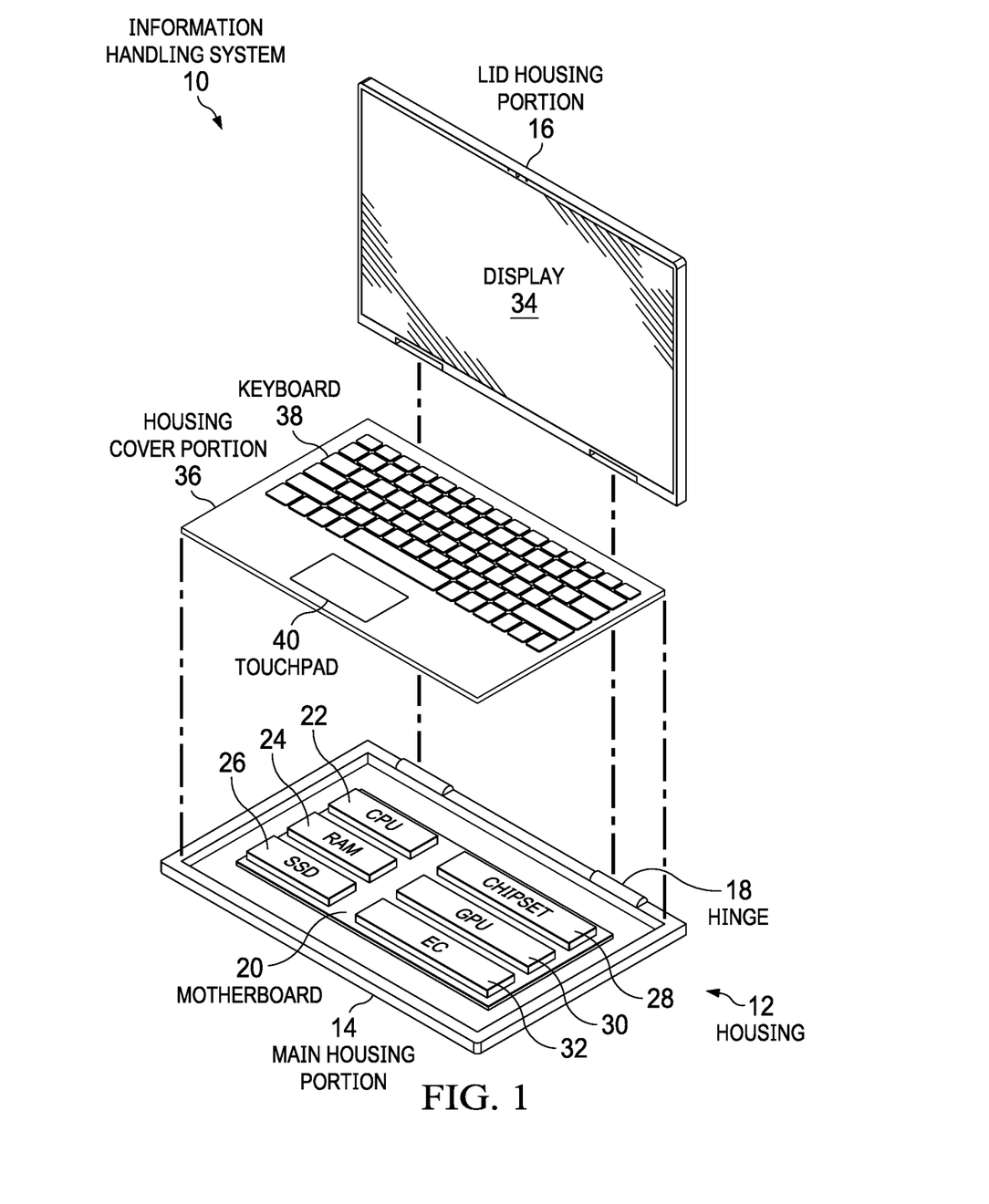
FIG. 1 depicts an exploded view of an information handling system having an edge-to-edge display front surface.

Referring now to FIG. 1, an exploded view depicts an information handling system 10 having an edge-to-edge display front surface. In the example embodiment, information handling system 10 has a portable housing 12 with a main housing portion 14 that contains processing components rotationally coupled to a lid housing portion 16 by a hinge 18. Housing 12 may, for example, rotate between a closed position, an open clamshell position as shown, and a tablet position. A motherboard 20 couples to main housing portion 14 to interface processing components that cooperate to process information. For example, a central processing unit (CPU) 22 executes instructions to process information in cooperation with a random access memory (RAM) 24 that stores the instructions and information. A solid state drive (SSD) 26 provides persistent storage of information during power down cycles, such as to store an operating system and applications that are retrieved at power up to RAM 24 for execution on CPU 22. A chipset 28 manages CPU 22 operations, such as clock speeds, memory accesses and graphics. A graphics processor unit (GPU) 30 processes information provided by CPU 22 to generate visual images for presentation at display 34, such as pixel values that define pixel colors for application at pixels of display 34. An embedded controller 32 manages system operating conditions, such as power distribution and thermal constraints, and also inputs from input devices, such as a keyboard 38 and touchpad 40 integrated in a housing cover portion 36 disposed over main housing portion 14. The example embodiment depicts a portable information handling system having a single display, however, alternative embodiments may integrate a display in each housing portion or have a single display in a planar tablet housing.

Figure 2A:
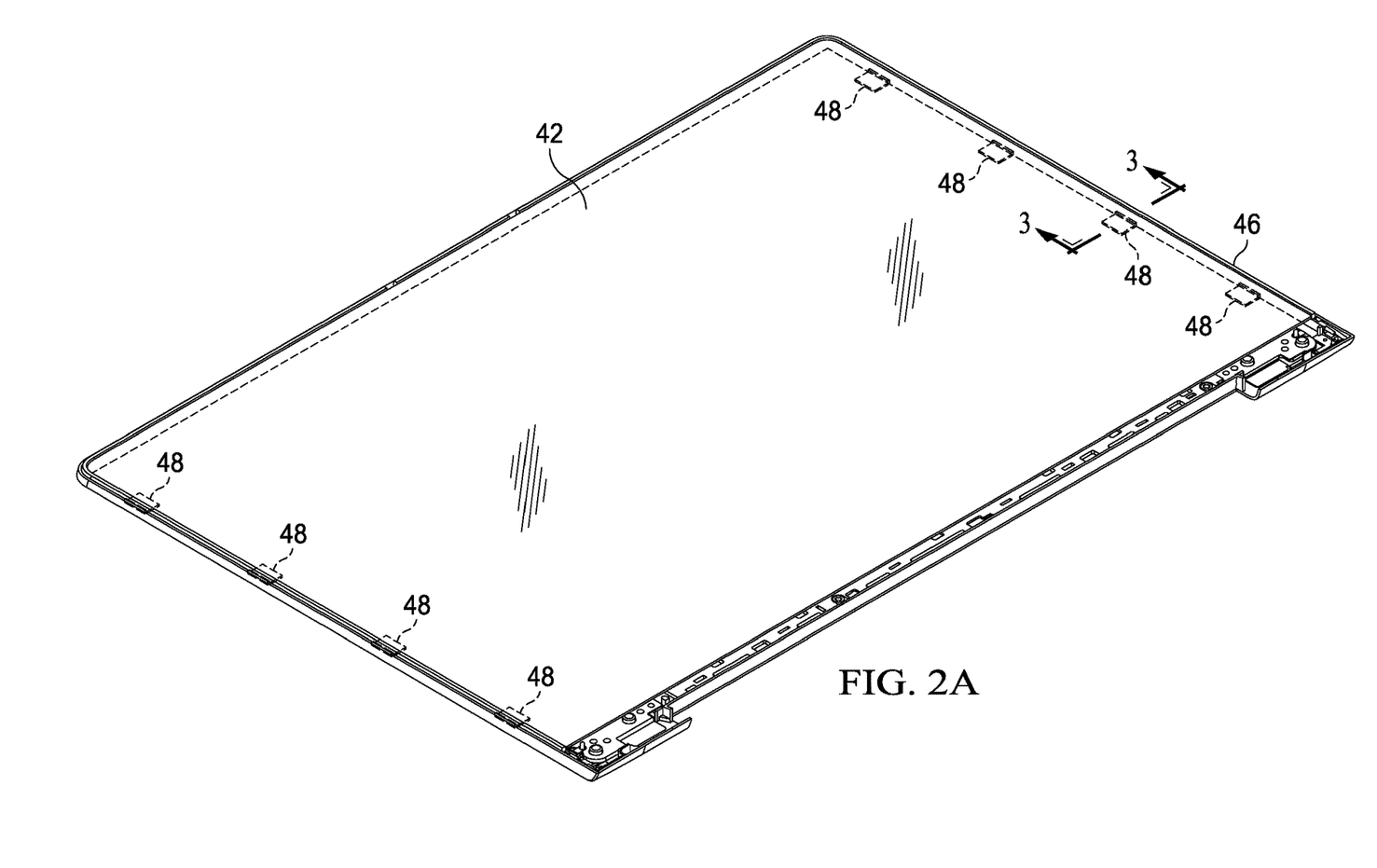
FIGS. 2A, 2B and 2C depict an example embodiment of a sliding structure for engaging a display in a housing in a removable manner.
Figure 2B:
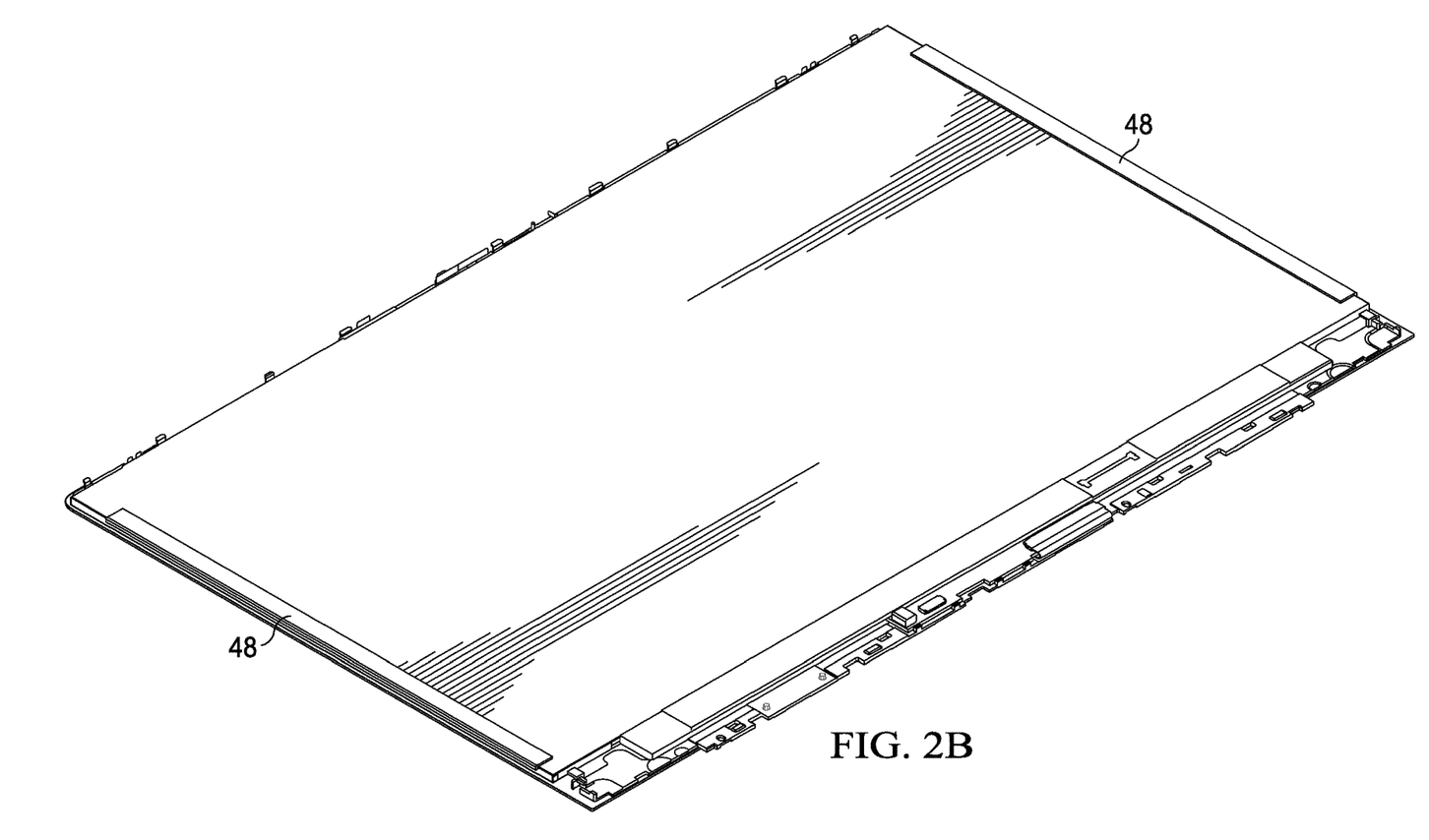
Figure 2C:
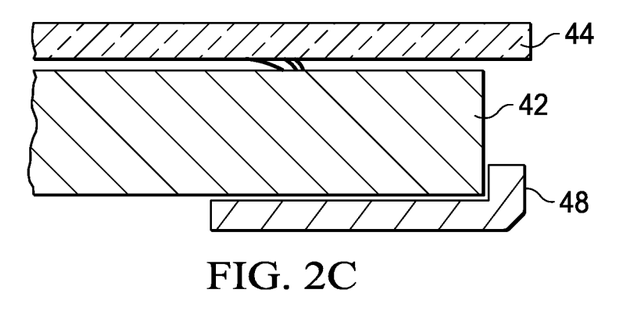
Figure 3:
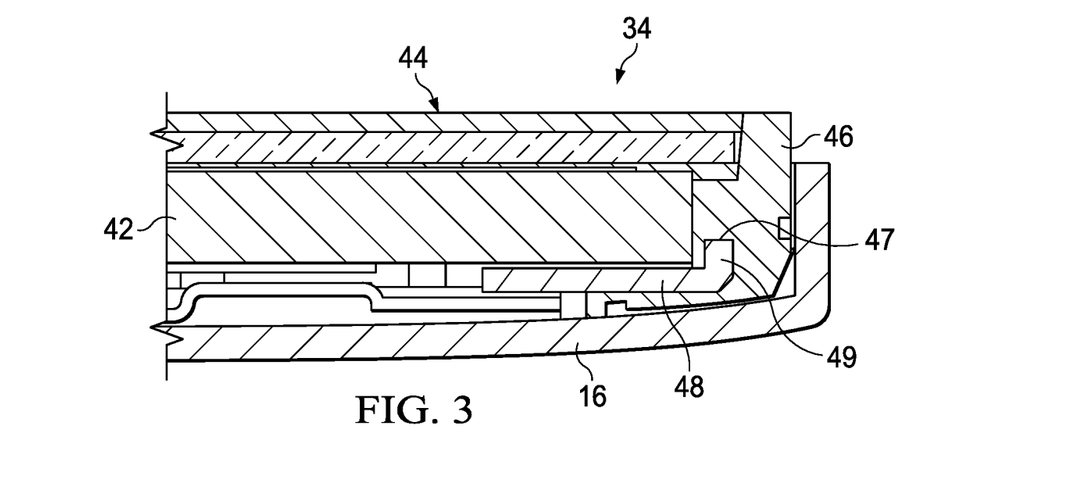
FIG. 3 depicts a side cutaway view of a display panel coupled to a lid housing portion by engagement of a sliding structure and coupling structure.

Referring now to FIGS. 2A, 2B and 2C, an example embodiment depicts a sliding structure for engaging a display in a housing in a removable manner. FIG. 2A depicts a front perspective view of the display panel disposed to slide into a housing portion in a sliding relationship from a lower end where a hinge couples to an upper end at the top of the system. A sliding structure 48 is disposed at opposing sides of the display panel having plural L-shaped members that fit under a lip formed in the lid housing portion. FIG. 3, described in greater depth below, depicts a member of sliding structure 48 extending from the display that enters and slides to hold the display in housing 12. FIG. 2B depicts the rear side of a display panel 42 having a sliding structure 48 coupled along opposing side corners and extending a member that engages in sliding structure 48. In the example embodiment, sliding structure 48 on each side is a single solid piece having a length of slightly less than the length of display panel 42, such as approximately 90% of the length, to strengthen the member and lip engagement. To couple display panel 42 into lid housing 16, display panel 42 slides sliding structure 48 from an entry at the hinge location along the length of coupling structure 46 and up against the opposing top side of display housing portion 16. FIG. 2C depicts a cutaway view of display panel 42 having a glass cover 44 at an upper surface and sliding structure 48 coupled to a bottom surface of display panel 42. In the example embodiment, sliding structure 48 has an L-shape with a greater length disposed on the bottom of display panel 42 and a shorter member extending out to and up the side of display panel 42. The extending member of sliding structure 48 provides coupling support of display panel 42 with glass cover 44 aligned to have a zero bezel against the housing once installed.

Referring now to FIG. 3, a side cutaway view depicts a display panel 42 coupled to lid housing portion 16 by engagement of a sliding structure 48 and coupling structure 46. Coupling structure 46 forms a lip 47 under which sliding structure 48 extending member 49 is captured so that display panel 42 is retained in position within lid housing portion 16. Coupling structure 46 provides a cutout space at the upper portion so that glass cover 44 rests against coupling structure 46 with a zero bezel appearance. Coupling structure 46 extends under display panel 42 to provide a base surface on which the bottom portion of the L-shape of sliding structure 48 slides during display panel 42 insertion. Essentially, coupling structure 46 defines a channel that guides sliding structure 48 to a desired position within lid housing portion 16.

Figure 4:
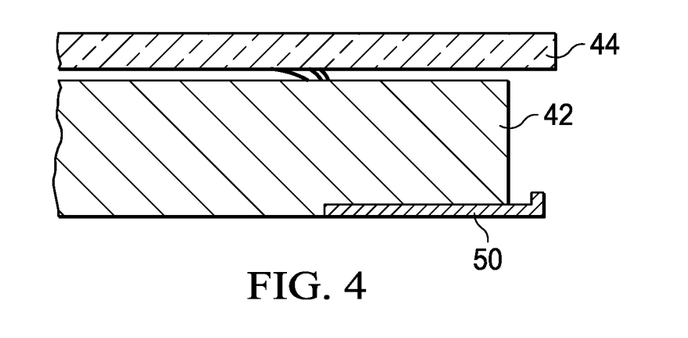
FIG. 4 depicts an alternative embodiment of a member to couple to the coupling structure.

Referring now to FIG. 4, an alternative embodiment of a member to couple to the coupling structure is depicted. In the example embodiment, display panel 42 has a metallic bottom housing with a metallic member 50 that extends out from the bottom surface. For instance, the metallic housing has metallic member 50 attached as a separate piece or pressed and bent directly from the metallic housing. In the example embodiment, lid housing portion 16 will include a coupling structure sized to fit metallic member 50.

Figures 5, 6:
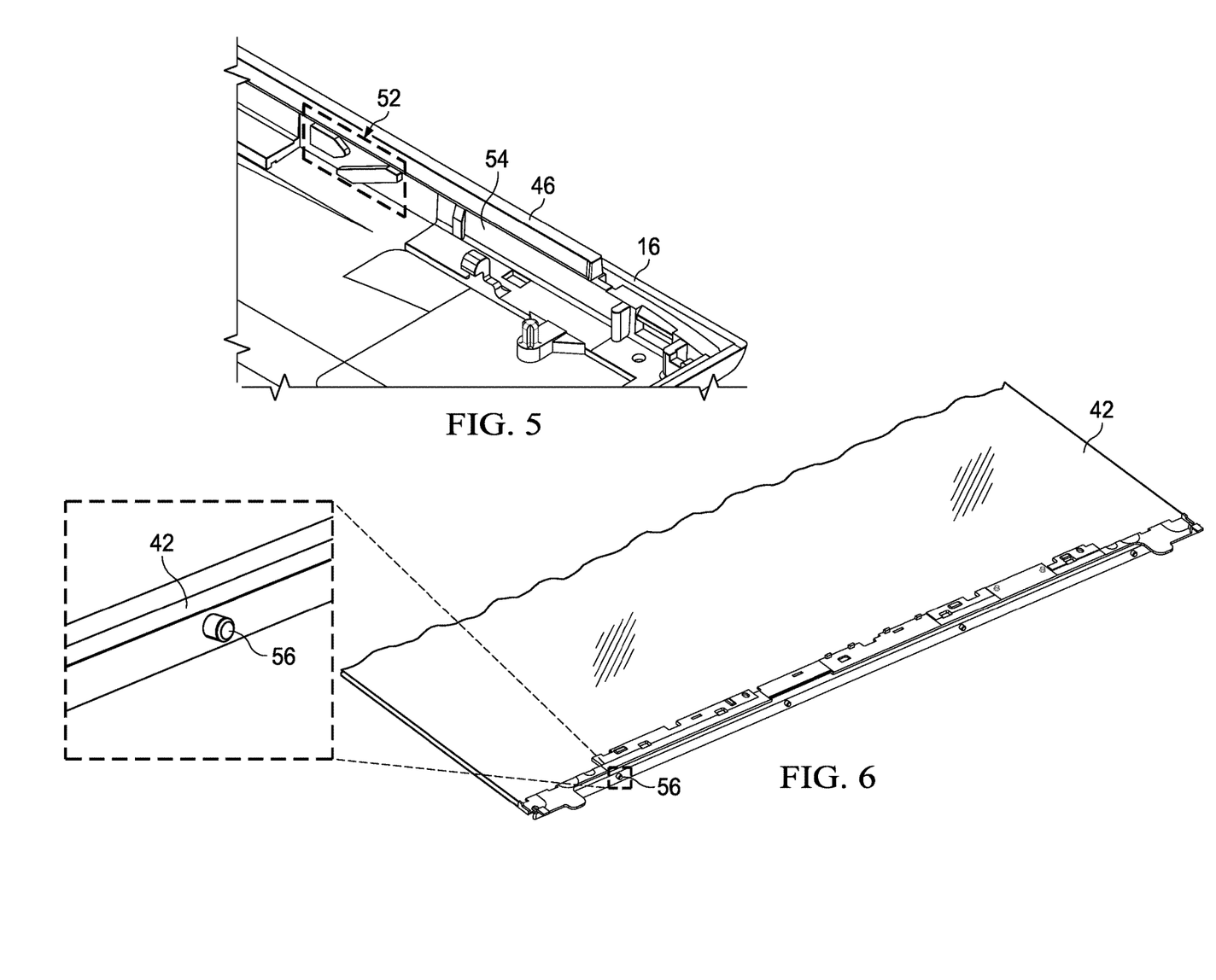
FIG. 5 depicts an alternative embodiment of the coupling structure to removably couple the display panel in the lid housing portion.
FIG. 6 depicts a side perspective view of an example embodiment of a display panel having pins disposed to engage the coupling structure.

Referring now to FIG. 5, an alternative embodiment of coupling structure 46 is depicted to removably couple display panel 42 in lid housing portion 16. In the example embodiment, coupling structure 46 has a plurality of channels 52 defined by an orbital structure that directs an inserted pin under a lip to hold the pin in position. An alignment structure 54 provides a reference for placing a display panel in place over the lid housing portion 16 so that a slight sliding motion down channel 52 allows the display to drop into position at the bottom of lid housing portion 16.

Referring now to FIG. 6, a side perspective view depicts an example embodiment of a display panel having pins 56 disposed to engage coupling structure 46. In the example embodiment, four pins 56 extend out from the side display panel 42 with substantially even spacing and each aligned to insert into a channel of the coupling structure. Pins 56, for example, couple to a metallic housing of display panel 42 to provide a robust structural coupling to the lid housing portion.

Figure 7A:
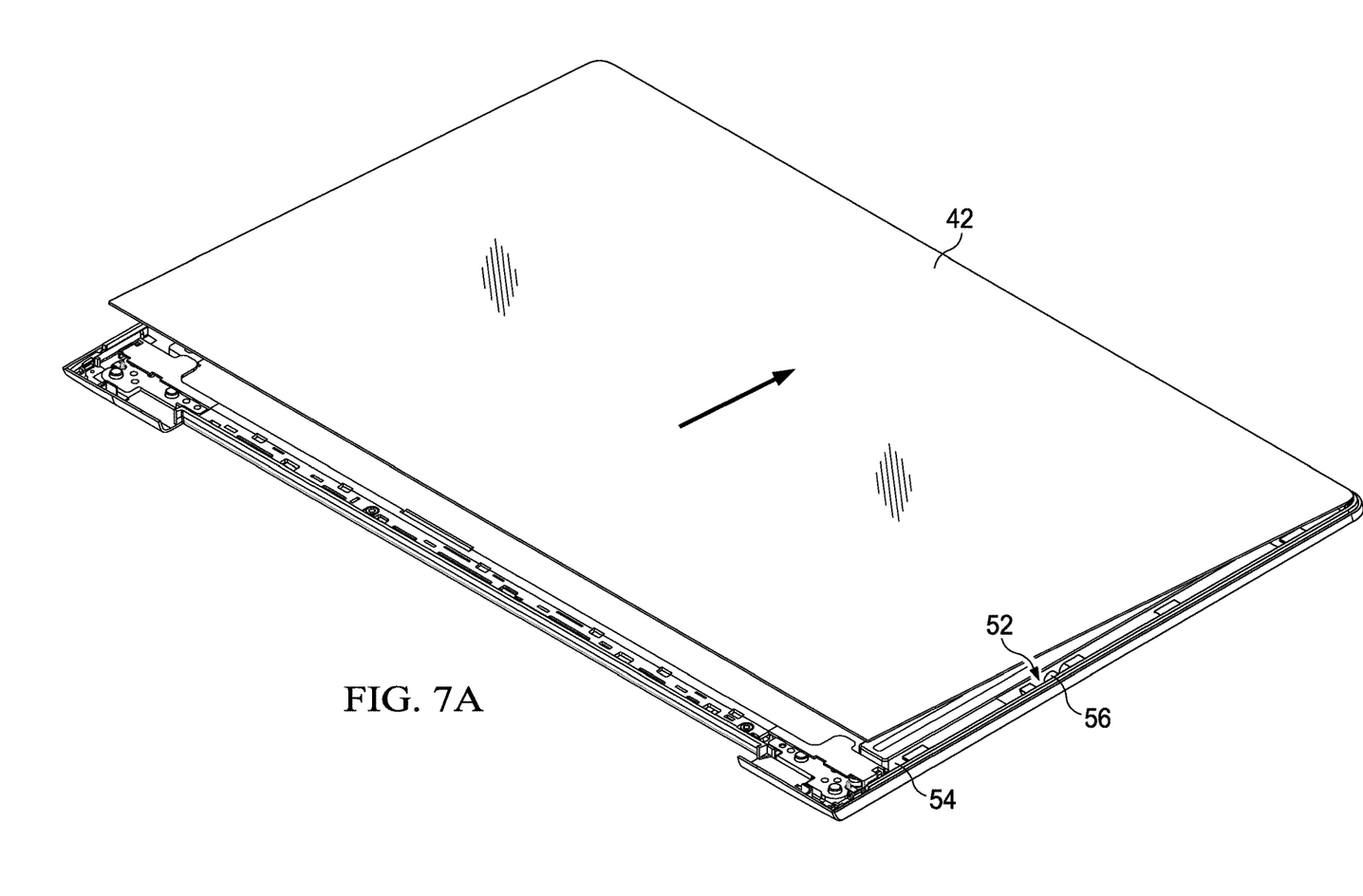
FIGS. 7A, 7B and 7C depict coupling of a display panel to a lid housing portion.
Figure 7B:
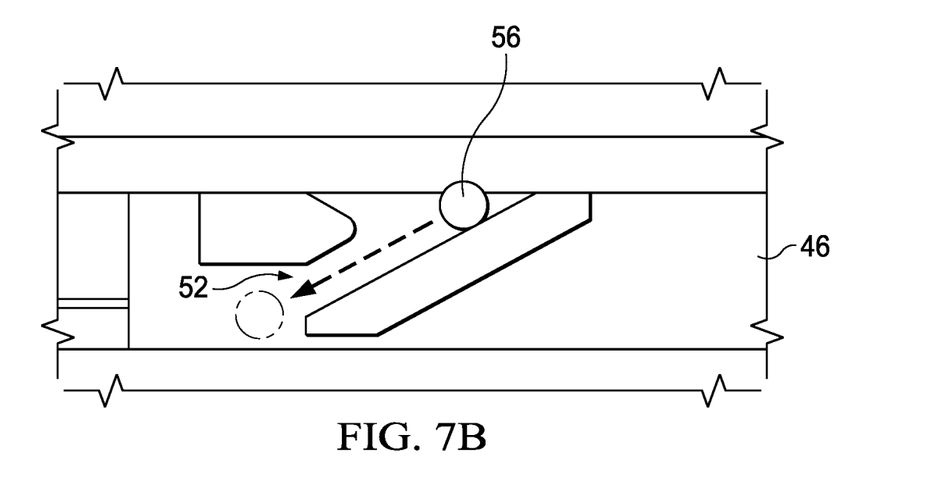
Figure 7C:
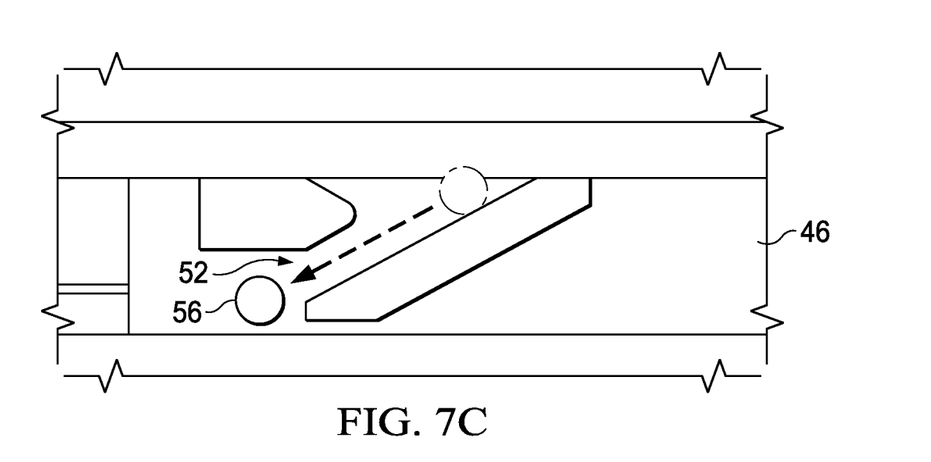

Referring now to FIGS. 7A, 7B and 7C coupling of a display panel to a lid housing portion is depicted. FIG. 7A depicts display panel 42 inserted against the top side wall of lid housing portion 16 and raised over the lower portion near the hinge coupling location. Pins 56 extending from display panel 42 align with channels 52 and alignment structure 54. As pins 56 insert into channels 52, the channels direct display panel 42 to slide forward and engage pins 56 under the lip of channel 52. In one embodiment, alignment structure 54 may include a snap feature that engages against the bottom side of display panel 42 to bias display panel 42 upwards and maintain pins 56 under the channel 52 lip. FIG. 7B depicts entry of pin 56 into channel 52 where an inclined member slopes downward to guide pin 52 towards a locking position under a horizontal lip. FIG. 7C depicts completed insertion with pin 56 inserted completely in channel 52 and under the lip. To remove the display panel, pin 56 is pulled back from under the lip and out of channel 52.

Figure 8:
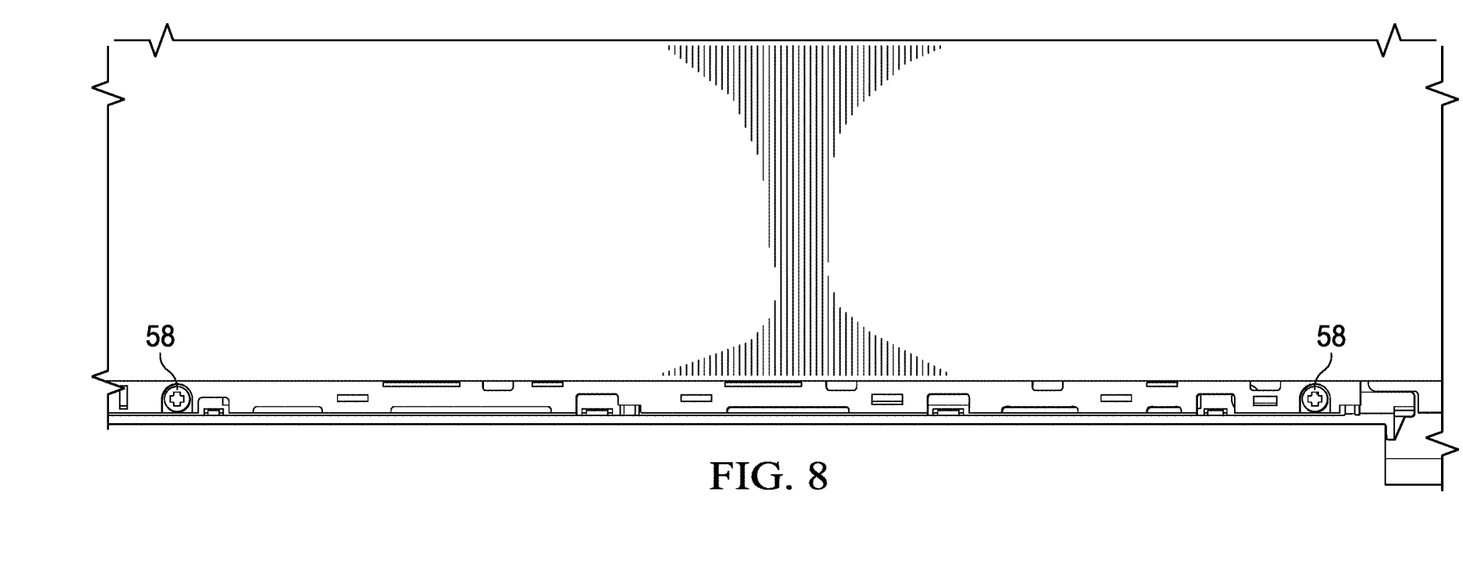
FIG. 8 depicts an upper perspective view of a display panel assembled in a lid housing portion and prevented from sliding out by screws.

Referring now to FIG. 8, an upper perspective view depicts a display panel assembled in a lid housing portion and prevented from sliding out by screws 58. Screws 58 pass through an opening at the base of the display panel to couple with the underlying housing. To remove the display panel, such as for maintenance, the screws are removed and the display panel slid out of the coupling structure.

Although the present invention has been described in detail, it should be understood that various changes, substitutions and alterations can be made hereto without departing from the spirit and scope of the invention as defined by the appended claims.

What is claimed is:

1. An information handling system comprising:
  a housing having first and second housing portions rotationally coupled by a hinge, the second housing portion having first and second lips extending out from a side surface of first and second opposing sides of the second housing portion;
  a processor disposed in the first housing portion and operable to execute instructions to process information;
  a memory disposed in the first housing portion and interfaced with the processor, the memory operable to store the instructions and information;
  a graphics processor interfaced with the processor and operable to process the information to define visual images for presentation at a display panel; and
  a display panel having a base coupled to a bottom of the display panel and an extension extending out from the base past a perimeter of the display panel, the extension sliding under the second housing portion first and second lips to couple the display panel to the second housing portion, the display panel interfaced with the graphics processor to present the visual images;
  wherein the display panel couples to the second housing portion by aligning the extension under the lip at the first and second opposing sides of the second housing portion, the display panel inserting at a first end of the second housing portion proximate the hinge and sliding to a second end of the second housing portion opposite the hinge.

2. The information handling system of claim 1 further comprising a sliding surface disposed at a bottom surface of the second housing portion, the sliding surface aligned with the base.

3. The information handling system of claim 2 further comprising a screw coupling the display panel to the second housing portion when the extension slide under the lip at the second housing portion end opposite the hinge, the screw restricting the display from sliding out of the second housing portion.

4. A method for coupling a display panel in an information handling system, the method comprising:
  inserting an extension member extending from first and second opposing sides of the display panel under a lip formed in first and second opposing sides of a housing of the information handling system, the display panel and the extension member inserted at an end of the housing proximate a hinge coupled to the housing;
  sliding the display panel relative to the housing to engage the extension members under the lips until the display panel slides from the end of the housing proximate the hinge to an end of the housing opposite the hinge; and coupling the display panel to the housing when the extension member is positioned under the lip at the end of the housing opposite the hinge.

5. The method of claim 4 further comprising:

coupling a sliding member to the opposing sides of the display panel at a bottom surface of the display panel, the sliding member having the extension member extending out from under the display panel towards each of the opposing sides of the housing; and coupling a sliding surface at a bottom surface of the housing at each of the opposing sides of the display panel, the sliding surface aligned with the sliding members to provide a path along which the display panel slides.

6. The method of claim 5 wherein:

each of the sliding members comprises an L-shape disposed at a bottom corner of the display panel and having a length of slightly less than a length of the display panel.

7. The method of claim 6 wherein coupling the display panel further comprises coupling a screw through the display panel into the housing after the display panel slides to the end of the housing opposite the hinge.

\* \* \* \* \*